United States Patent
Heo et al.

(10) Patent No.: US 9,952,108 B2
(45) Date of Patent: Apr. 24, 2018

(54) MULTI-AXIS FORCE SENSOR WITH SUPPRESSING AXIAL INTERFERENCE CAPABILITIES

(71) Applicant: I2A SYSTEMS CO., LTD, Daejeon (KR)

(72) Inventors: Pil Won Heo, Daejeon (KR); Gwang Min Gu, Sejong (KR)

(73) Assignee: I2A SYSTEMS CO., LTD., Daejeon (KR)

( * ) Notice: Subject to any disclaimer, the term of this patent is extended or adjusted under 35 U.S.C. 154(b) by 88 days.

(21) Appl. No.: 15/084,068

(22) Filed: Mar. 29, 2016

(65) Prior Publication Data

US 2017/0261391 A1 Sep. 14, 2017

(30) Foreign Application Priority Data

Mar. 9, 2016 (KR) .................. 10-2016-0028379

(51) Int. Cl.
| | | |
|---|---|---|
| *G01D 7/00* | (2006.01) | |
| *G01L 5/04* | (2006.01) | |
| *G01L 1/26* | (2006.01) | |
| *G01L 5/16* | (2006.01) | |
| *G01B 11/14* | (2006.01) | |

(52) U.S. Cl.
CPC .............. *G01L 5/16* (2013.01); *G01B 11/14* (2013.01)

(58) Field of Classification Search
None
See application file for complete search history.

(56) References Cited

U.S. PATENT DOCUMENTS

| | | | | |
|---|---|---|---|---|
| 5,889,214 A | * | 3/1999 | Kang | G01L 5/161 73/862.043 |
| 6,038,933 A | * | 3/2000 | Meyer | G01L 1/2206 73/146 |
| 6,792,815 B2 | * | 9/2004 | McDearmon | G01D 21/02 73/862.041 |
| 6,809,529 B2 | * | 10/2004 | Okada | G01L 1/142 324/681 |
| 6,868,746 B1 | * | 3/2005 | Peshkin | G01L 1/14 73/862.53 |
| 7,047,826 B2 | * | 5/2006 | Peshkin | G01L 1/14 73/862.53 |
| 7,219,561 B2 | * | 5/2007 | Okada | G01L 5/165 73/862.043 |

(Continued)

FOREIGN PATENT DOCUMENTS

KR      10 2016 0106959      9/2016

*Primary Examiner* — Peter Macchiarolo
*Assistant Examiner* — Jermaine Jenkins
(74) *Attorney, Agent, or Firm* — Hamilton, Brook, Smith & Reynolds, P.C.

(57) ABSTRACT

Disclosed herein is a multi-axis force sensor which includes a vertical measurement module to measure a vertical component of force applied to a point of application, and a horizontal measurement module to measure a horizontal component of force applied to the point of application, wherein the vertical measurement module has a body horizontally moved by the horizontal component of force applied to the point of application, and the horizontal measurement module measures the horizontal component of force applied to the point of application, based on the movement of the body of the vertical measurement module.

10 Claims, 9 Drawing Sheets

(56) References Cited

U.S. PATENT DOCUMENTS

| | | | | |
|---|---|---|---|---|
| 7,743,672 B2* | 6/2010 | Kurtz | ............... | G01L 3/1457 |
| | | | | 73/862.041 |
| 8,710,737 B2* | 4/2014 | Matsuura | ............ | H01L 33/54 |
| | | | | 313/506 |
| 9,032,817 B2* | 5/2015 | Berme | ............ | G01L 1/2206 |
| | | | | 73/862.045 |
| 9,274,014 B2* | 3/2016 | Janik | ............ | G01L 5/16 |
| 9,364,952 B2* | 6/2016 | Arai | ............ | G01L 5/226 |
| 9,448,128 B2* | 9/2016 | Kim | ............ | G01L 5/161 |

\* cited by examiner

LIGHT-EMITTING PART   LIGHT-RECEIVING PART

MULTI-AXIS FORCE SENSOR WITH SUPPRESSING AXIAL INTERFERENCE CAPABILITIES

RELATED APPLICATION

This application claims priority under 35 U.S.C. § 119 or 365 to Korean Application No. 10-2016-0028379, filed Mar. 9, 2016. The entire teachings of the above application are incorporated herein by reference.

TECHNICAL FIELD

The present invention relates to a force sensor, and more particularly, to a multi-axis force sensor capable of suppressing axial interference in a plurality of directions.

BACKGROUND

Multi-axis force sensors are generally used in order for a robot to move according to a person's intention when the robot and the person work together, and are widely used in order for the robot to move based on force control in assembly or various works using the robot's hands. For example, a multi-axis force sensor is applied to a medical robot in order to feed back the contact force of a tool, which is used for a micro-invasive operation, into a user. In addition, a multi-axis force sensor is applied to the ankle of a humanoid robot or the sole of humanoid robot's foot in order to control the balance of the robot, or is applied to the palm of humanoid robot's hand in order for the robot to stably come into contact with an object when lifting the object.

In recent years, these multi-axis force sensors have been increasingly utilized in various fields. For example, the multi-axis force sensors are utilized in wearable robots, wearable devices, IOT (Internet of things) devices, etc.

Conventionally, three types of multi-axis force sensors are mainly utilized. Specifically, they are a series-stacked multi-axis force sensor, a parallel manipulator multi-axis force sensor, and a monolithic multi-axis force sensor. Here, 1) the series-stacked multi-axis force sensor is a force sensor in which single-axis elastic bodies are arranged in series, 2) the parallel manipulator multi-axis force sensor is a force sensor in which the joint portion of a parallel manipulator having three degrees of freedom or six degrees of freedom is replaced with a flexure joint, and 3) the monolithic multi-axis force sensor is a force sensor designed such that an elastic body has a slit or spoke shape.

However, these conventional multi-axis force sensors are problematic in that a complicated calibration process is required to estimate each axial force, there is a limit to miniaturization, and an error occurs due to axial interference of 3 to 5% caused when each axial force is measured.

Accordingly, it is necessary to develop a new multi-axis force sensor in order to resolve the above problems.

The foregoing is intended merely to aid in the understanding of the background of the present invention, and is not intended to mean that the present invention falls within the purview of the related art that is already known to those skilled in the art.

SUMMARY

An object of the present invention is to provide a multi-axis force sensor capable of suppressing axial interference in a plurality of directions, having improved accuracy of axial measurement, and conveniently calibrating a sensor signal.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, a multi-axis force sensor includes a vertical measurement module to measure a vertical component of force applied to a point of application, and a horizontal measurement module to measure a horizontal component of force applied to the point of application.

The vertical measurement module may have a body horizontally moved by the horizontal component of force applied to the point of application, and the horizontal measurement module may measure the horizontal component of force applied to the point of application, based on the movement of the body of the vertical measurement module.

The vertical measurement module may include a deformation measurement sensor to measure a deformation by the vertical component of force, or a displacement measurement sensor to measure a variation in displacement by the vertical component of force.

The displacement measurement sensor may include an optical sensor having a light-emitting part and a light-receiving part, and the light-emitting and light-receiving parts of the optical sensor may be formed on the same plane.

The multi-axis force sensor may further include decoupling units for decoupling the vertical and horizontal components of force applied to the point of application, and each of the decoupling units may have a ball shape, a roller shape, a roller guide shape, or a linear guide.

The multi-axis force sensor may further include an auxiliary horizontal measurement frame formed between the vertical measurement module and a side frame while being coupled to each of the vertical measurement module and the side frame.

The body of the vertical measurement module may be moved in a first horizontal direction by the horizontal component of force applied to the point of application, the auxiliary horizontal measurement frame may be moved in a second horizontal direction by the horizontal component of force applied to the point of application, and the first horizontal direction may be perpendicular to the second horizontal direction.

The decoupling units may include a first decoupling unit formed between the auxiliary horizontal measurement frame and the vertical measurement module, and a second decoupling unit formed between the side frame and the auxiliary horizontal measurement frame, thereby decoupling the horizontal component of force applied to the point of application into a first horizontal component of force and a second horizontal component of force.

Each of the first and second decoupling units may have a ball shape or a roller shape, and the decoupling units may further include a ball shape or a roller shape formed between the vertical measurement module and a bottom frame and between the auxiliary horizontal measurement frame and the bottom frame.

Each of the first and second decoupling units may have a roller guide shape or a linear guide shape.

The horizontal measurement module may include a first horizontal measurement module to measure the first horizontal component of force, and a second horizontal measurement module to measure the second horizontal component of force, and each of the first and second horizontal measurement modules may include a deformation measurement sensor or a displacement measurement sensor.

The displacement measurement sensor may be installed in a groove formed on a surface of the auxiliary horizontal measurement frame or on a surface of the side frame.

The first horizontal measurement module may include the displacement measurement sensor, the displacement measurement sensor of the first horizontal measurement module may include an optical sensor having a light-emitting part and a light-receiving part formed on the same plane, and the optical sensor may be installed in a groove formed on the surface of the auxiliary horizontal measurement frame.

The second horizontal measurement module may include the displacement measurement sensor, the displacement measurement sensor of the second horizontal measurement module may include an optical sensor having a light-emitting part and a light-receiving part formed on the same plane, and the optical sensor may be installed in the groove formed on the surface of the side frame.

In accordance with another aspect of the present invention, a force measurement apparatus includes a multi-axis force sensor to measure forces in a plurality of directions, and a processor to process a signal generated by the multi-axis force sensor.

The multi-axis force sensor may include a vertical measurement module to measure a vertical component of force applied to a point of application, and a horizontal measurement module to measure a horizontal component of force applied to the point of application, the vertical measurement module may have a body horizontally moved by the horizontal component of force applied to the point of application, and the horizontal measurement module may measure the horizontal component of force applied to the point of application, based on the movement of the body of the vertical measurement module.

The force measurement apparatus may be a robot apparatus, a wearable apparatus, or an IOT (Internet of things) apparatus.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

A multi-axis force sensor and an apparatus using the same according to exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Meanwhile, the term "module" used herein may mean a single component or a plurality of components to realize specific functions. When the term "module" means the plurality of components, the components may be integrated or separated components, but may refer to interconnected components.

In addition, the terms such as "first and/or second" used herein are used to describe various elements of the present invention, and are not intended to limit the invention.

Furthermore, it will be further understood that the terms "comprises/comprising" or "includes/including" used herein specify the presence of stated elements and/or components, but do not preclude the presence or addition of one or more other elements and/or components thereof.

Hereinafter, a multi-axis force sensor according to the present invention will be generally described.

The multi-axis force sensor according to the present invention may at least include a cover frame, a vertical measurement module, a horizontal measurement module, decoupling units, a bottom frame, and a side frame.

The multi-axis force sensor may decouple the force applied to a point of application into a horizontal component of force and a vertical component of force using the decoupling units, and may independently measure the decoupled components of force.

The cover frame is a component which serves as a cover of the multi-axis force sensor and simultaneously serves as a point of application (a point of application of force). The cover frame may be preferably coupled to the upper portion of the "body of the vertical measurement module", and a force applied therethrough may be transferred to the "body of the vertical measurement module".

In addition, the cover frame may be preferably made of an elastic material, and thus may be physically deformed.

Meanwhile, the force applied to the cover frame may be decoupled into the vertical component of force and the horizontal component of force by the decoupling units, as described above, and only the vertical component of force from among the decoupled components of force is used to deform the cover frame.

The vertical measurement module is a component to measure the decoupled vertical component of force. The vertical measurement module may measure the vertical deformation of the cover frame, and thus may calculate the vertical component of force.

In addition, the vertical measurement module may measure the vertical component of force in a displacement measurement manner or in a deformation measurement manner. 1) In the former case, the vertical measurement module may include a body opened in a direction in which it is coupled to the cover frame, and a displacement measurement sensor formed on one surface within the body.

Accordingly, the vertical measurement module may measure the displacement of the cover frame using the displacement measurement sensor and the opened body, and thus may calculate the decoupled vertical component of force. Meanwhile, the displacement measurement sensor may be an optical sensor, and preferably may be an optical sensor in which light-emitting and light-receiving parts are formed on the same plane. 2) In the latter case, the vertical measurement module may include a deformation measurement sensor which is mounted or coupled to the cover frame. Accordingly, the vertical measurement module may directly measure the deformation of the cover frame using the deformation measurement sensor, and thus may measure the vertical component of force. Meanwhile, the deformation measurement sensor may be a resistive sensor, a strain gauge sensor, a pressure sensor, a capacitive sensor, or the like.

Meanwhile, the "body of the vertical measurement module" has a structure that may move in a horizontal direction, depending on the decoupling units, and may be horizontally moved by the horizontal component of force.

The horizontal measurement module is a component to measure the decoupled horizontal component of force. The horizontal measurement module may preferably measure the horizontal component of force, based on the horizontal movement of the "body of the vertical measurement module".

In addition, the horizontal measurement module may measure the horizontal component of force in a displacement measurement manner or in a deformation measurement manner, similar to the vertical measurement module.

In addition, the horizontal measurement module may measure a horizontal component of force in a single horizontal direction (e.g., either in an X-axis direction or in a Y-axis direction), or a plurality of horizontal components of force in a plurality of horizontal directions perpendicular to each other (e.g., in all X-axis and Y-axis directions). 1) In the former case, the "body of the vertical measurement module" may be moved in a specific horizontal direction by the decoupling units. In addition, the horizontal measurement module may include a deformation measurement sensor installed on a coupling portion (e.g., a coupling portion in which the "body of the vertical measurement module" is coupled to the side frame), or a displacement measurement sensor installed so as to face the "body of the vertical measurement module", and thus may measure a horizontal component of force in the specific horizontal direction. 2) In the latter case, the horizontal measurement module may further include an auxiliary horizontal measurement frame formed between the "body of the vertical measurement module" and the side frame. In addition, the "body of the vertical measurement module" may be moved in a first horizontal direction by the decoupling units, and the auxiliary horizontal measurement frame may be moved in a second horizontal direction (which is preferably perpendicular to the first horizontal direction) by the decoupling units. In addition, the horizontal measurement module may include a plurality of deformation measurement sensors which are respectively installed on coupling portions (e.g., a coupling portion in which the "body of the vertical measurement module" is coupled to the auxiliary horizontal measurement frame, a coupling portion in which the auxiliary horizontal measurement frame is coupled to the side frame, etc.), or a plurality of displacement measurement sensors installed so as to respectively face the "body of the vertical measurement module" and the auxiliary horizontal measurement frame, and thus may measure a first horizontal component of force and a second horizontal component of force.

The decoupling units are components to decouple the force applied to the point of application into a plurality of components of force. For example, the decoupling units are components to decouple the force applied to the point of application into 1) a vertical component of force and a horizontal component of force, or 2) a vertical component of force, a first horizontal component of force, and a second horizontal component of force.

The decoupling units may decouple 1) the vertical deformation of the cover frame and the horizontal movement of the "body of the vertical measurement module", or 2) the vertical deformation of the cover frame, the movement of the "body of the vertical measurement module" in the first horizontal direction, and the movement of the auxiliary horizontal measurement frame in the second horizontal direction.

Meanwhile, each of the decoupling units may have a ball shape, a roller shape, a linear guide shape, a roller guide shape, or the like.

In addition, the decoupling units may be formed between the "body of the vertical measurement module" and the bottom frame, between the "body of the vertical measurement module" and the side frame, between the "body of the vertical measurement module" and the auxiliary horizontal measurement frame, between the auxiliary horizontal measurement frame and the side frame, between the auxiliary horizontal measurement frame and the bottom frame, etc.

The bottom frame and the side frame are components which serve as a housing of the multi-axis force sensor. The bottom frame and the side frame may serve as a body of the multi-axis force sensor.

Hereinafter, various examples of a multi-axis force sensor according to an embodiment of the present invention will be described with reference to FIGS. 1 to 10.

An example of a two-axis force sensor according to the embodiment of the present invention will be described with reference to FIGS. 1 and 2.

The two-axis force sensor may include a vertical measurement module, a horizontal measurement module, decoupling units, a side frame, a bottom frame, and a cover frame.

The cover frame, which is designated by reference numeral 170, serves as a cover of the two-axis force sensor and simultaneously serves as a point of application (a point of application of force). The cover frame 170 may be preferably coupled to the upper portion of a body 110 of the vertical measurement module, and a force applied therethrough may be transferred to the body 110 of the vertical measurement module.

In addition, the cover frame 170 may be preferably made of an elastic material, and thus may be physically deformed.

Meanwhile, the force applied to the cover frame 170 is decoupled into a vertical component of force and a horizontal component of force by the decoupling units, which are designated by reference numeral 140 and 141, and only the vertical component of force from among the decoupled components of force is actually applied to the cover frame 170 so as to physically deform the cover frame. Referring to FIG. 1, it may be seen that the cover frame 170 is vertically deformed by the decoupled vertical component of force.

The vertical measurement module is a component to measure the decoupled vertical component of force.

The vertical measurement module may include a body 110 opened in a direction in which it is coupled to the cover frame 170, and a displacement measurement sensor 111 formed on one surface within the body 110. Accordingly, the vertical measurement module may measure the displacement of the cover frame 170 using the displacement measurement sensor 111, and thus may calculate the vertical component of force.

Figure 3:
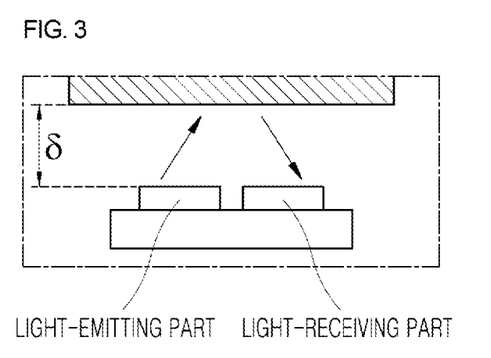
FIG. 3 is a view illustrating an optical sensor according to the embodiment of the present invention.

In addition, the displacement measurement sensor 111 may be an optical sensor, and preferably may be an optical sensor in which light-emitting and light-receiving parts are formed on the same plane, as illustrated in FIG. 3. Through such a structure, the optical sensor may be formed on one surface (a single surface) within the body 110, and may help in miniaturizing the two-axis force sensor.

In addition, the optical sensor may be installed in a groove formed on one surface within the body 110. Thus, it is possible to prevent the damage of the optical sensor even though the optical sensor is installed very close to the cover frame 170 in order to be linearly operated (for reference, the optical sensor must be installed very close to an object to be measured in order to assure the linear operation of the optical sensor, as will be seen in the graph of FIG. 9).

Meanwhile, the body 110 of the vertical measurement module has a structure that may move in a specific horizontal direction, depending on the decoupling units 140 and 141. In addition, one side of the body 110 of the vertical measurement module may be coupled to the side frame, which is designated by reference numeral 150, by an elastic body. Accordingly, when the decoupled horizontal component of force is applied to the body 110 of the vertical measurement module, the body 110 of the vertical measurement module may be displaced in the specific horizontal direction while deforming the elastic body (the elastic body coupling the body 110 to the side frame 150), as illustrated in FIG. 2.

The horizontal measurement module is a component to measure the decoupled horizontal component of force. The horizontal measurement module may measure the horizontal component of force, based on the horizontal movement of the body 110 of the vertical measurement module.

To this end, the horizontal measurement module may include a displacement measurement sensor 121 which is installed on the side frame 150 while facing the body 110 of the vertical measurement module. Accordingly, the horizontal measurement module may measure the displacement of the body 110 of the vertical measurement module using the displacement measurement sensor 121, and thus may calculate the horizontal component of force.

Meanwhile, the displacement measurement sensor 121 may be an optical sensor as described above, and preferably may be an optical sensor in which light-emitting and light-receiving parts are formed on the same plane, as illustrated in FIG. 3. In addition, the optical sensor may be installed in a groove formed on one surface within the side frame 150. Thus, it is possible to prevent the damage of the optical sensor even though the optical sensor is installed very close to the side frame 150 in order to be linearly operated.

The decoupling units 140 and 141 are components to decouple the force, applied to the point of application, into a vertical component of force and a horizontal component of force. The decoupling units 140 and 141 may decouple the vertical deformation of the cover frame 170 (see FIG. 1) and the horizontal movement of the body 110 of the vertical measurement module (see FIG. 2).

To this end, each of the decoupling units 140 and 141 may have a ball shape, a roller shape, or the like. In addition, the decoupling units 140 and 141 may preferably include bottom decoupling units 140 formed between the body 110 of the vertical measurement module and the bottom frame, which is designated by reference numeral 160, and side decoupling units 141 formed between the body 110 of the vertical measurement module and the side frame 150.

Meanwhile, the each of the decoupling units 140 and 141 may have a guide shape (e.g., a linear guide shape or a roller guide shape) instead of the ball shape or the roller shape.

The side frame 150 and the bottom frame 160 are components which serve as a housing of the two-axis force sensor. The side frame 150 and the bottom frame 160 may serve as a body of the two-axis force sensor.

As described above, when a force is applied to the cover frame 170 serving as a point of application, the above-mentioned two-axis force sensor may decouple the applied force into a vertical component of force and a horizontal component of force using the decoupling units 140 and 141. Here, the decoupled vertical component of force acts as a force for deforming the cover frame 170 in a vertical direction, and may be measured by the displacement measurement sensor 111 of the vertical measurement module. In addition, the decoupled horizontal component of force acts as a force for moving the body 110 of the vertical measurement module in a specific horizontal direction, and may be measured by the displacement measurement sensor 121 of the horizontal measurement module.

Figure 10:
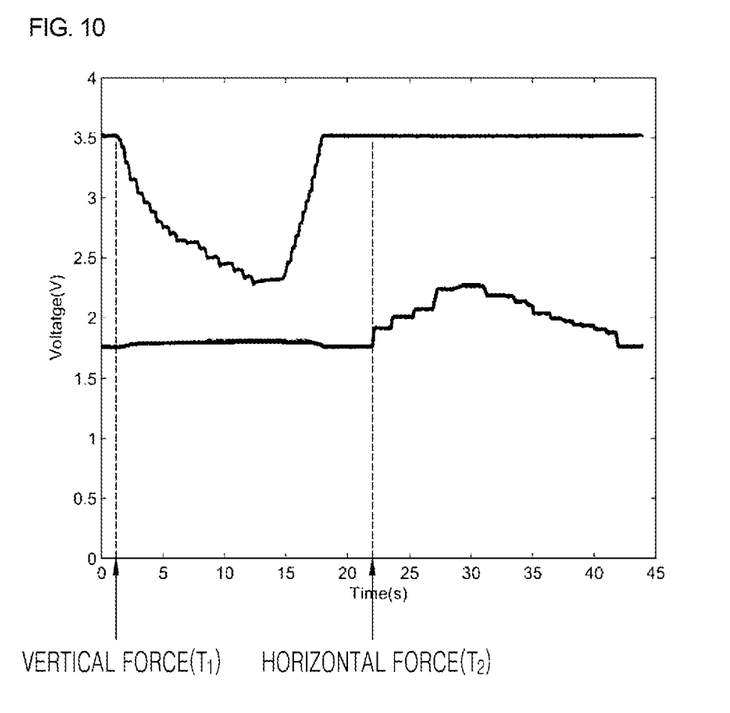
FIG. 10 is a graph illustrating the interference suppression of a multi-axis force sensor according to the embodiment of the present invention.

Since the two-axis force sensor of the present invention decouples the vertical component of force and the horizontal component of force and then independently measures them, there is no interference between the vertical measurement and the horizontal measurement. Referring to FIG. 10, such interference suppression may be seen through experiments. As seen in FIG. 10, the two-axis force sensor changes only a voltage of the displacement measurement sensor 111 of the vertical measurement module (top graph) when a vertical force T1 is applied thereto, and changes only a voltage of the displacement measurement sensor 121 of the horizontal measurement module when a horizontal force T2 is applied thereto, thereby suppressing axial interference in a plurality of directions (preventing the vertical component of force from interfering in the horizontal measurement or the horizontal component of force from interfering in the vertical measurement.

Figure 4:
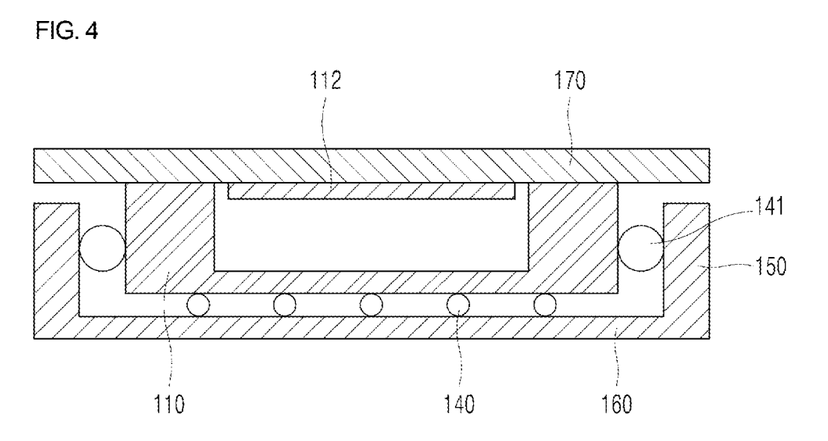
FIGS. 4 and 5 are cross-sectional views illustrating another example of a two-axis force sensor according to the embodiment of the present invention.
Figure 5:
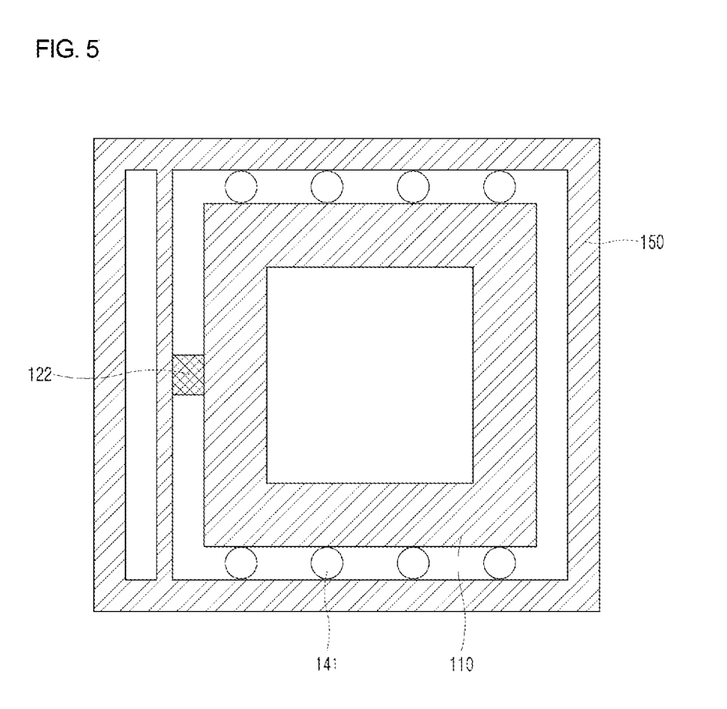

Another example of a two-axis force sensor according to the embodiment of the present invention will be described with reference to FIGS. 4 and 5.

Figure 1:
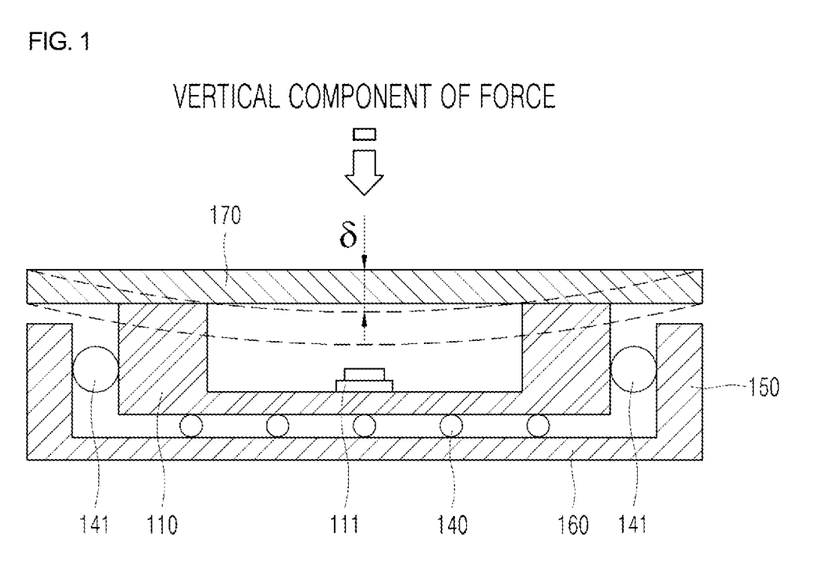
FIGS. 1 and 2 are cross-sectional views illustrating an example of a two-axis force sensor according to an embodiment of the present invention.
Figure 2:
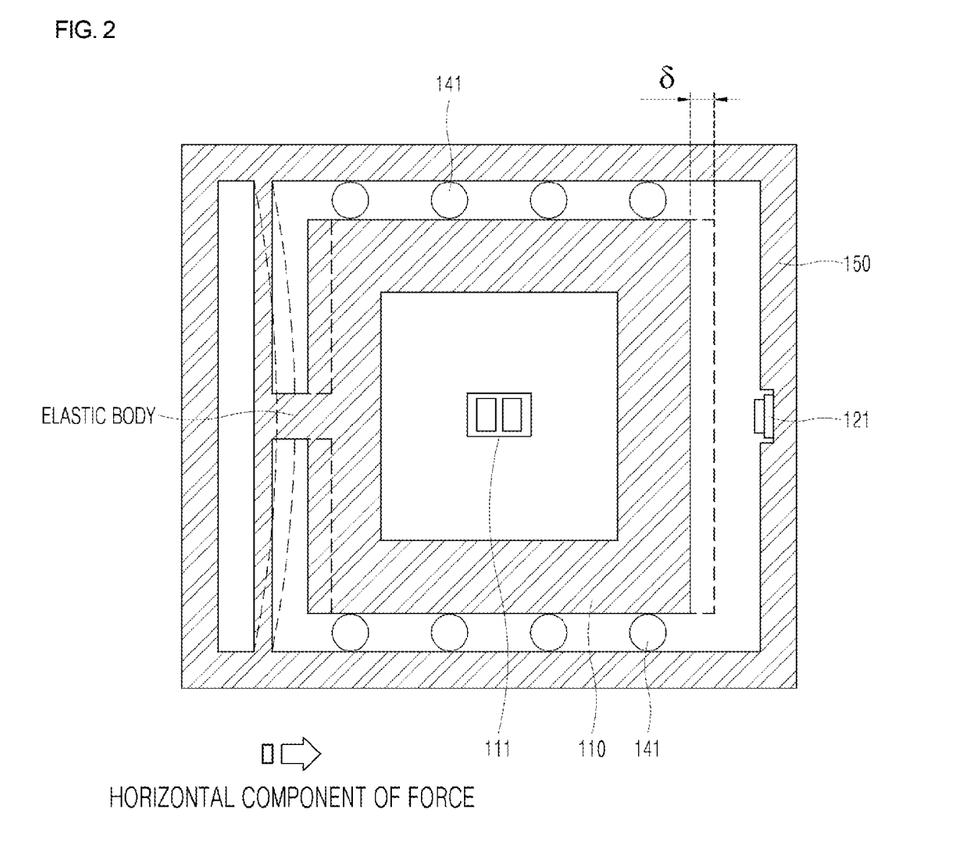

The two-axis force sensor in the present example may measure a vertical component of force and a horizontal component of force in a deformation measurement manner instead of the displacement measurement manner described in FIGS. 1 and 2.

To this end, a vertical measurement module may include a deformation measurement sensor 112 instead of the displacement measurement sensor 111, and a horizontal measurement module may include a deformation measurement sensor 122 instead of the displacement measurement sensor 121.

In addition, the deformation measurement sensor 112 included in the vertical measurement module may be mounted or coupled to a cover frame 170. The deformation measurement sensor 122 included in the horizontal measurement module may be formed on a coupling portion in which a body 110 of the vertical measurement module is coupled to a side frame 150.

Meanwhile, each of the deformation measurement sensors 112 and 122 may be a resistive sensor, a strain gauge sensor, a pressure sensor, a capacitive sensor, or the like.

When a force is applied to the cover frame 170 serving as a point of application, the two-axis force sensor in the present example may decouple the applied force into a vertical component of force and a horizontal component of force using decoupling units 140 and 141. Here, the decoupled vertical component of force acts as a force for deforming the cover frame 170 in a vertical direction, and is measured by the deformation measurement sensor 112 of the vertical measurement module. In addition, the decoupled horizontal component of force acts as a force for moving the body 110 of the vertical measurement module in a specific horizontal direction, and is measured by the deformation measurement sensor 122 of the horizontal measurement module.

Figure 6:
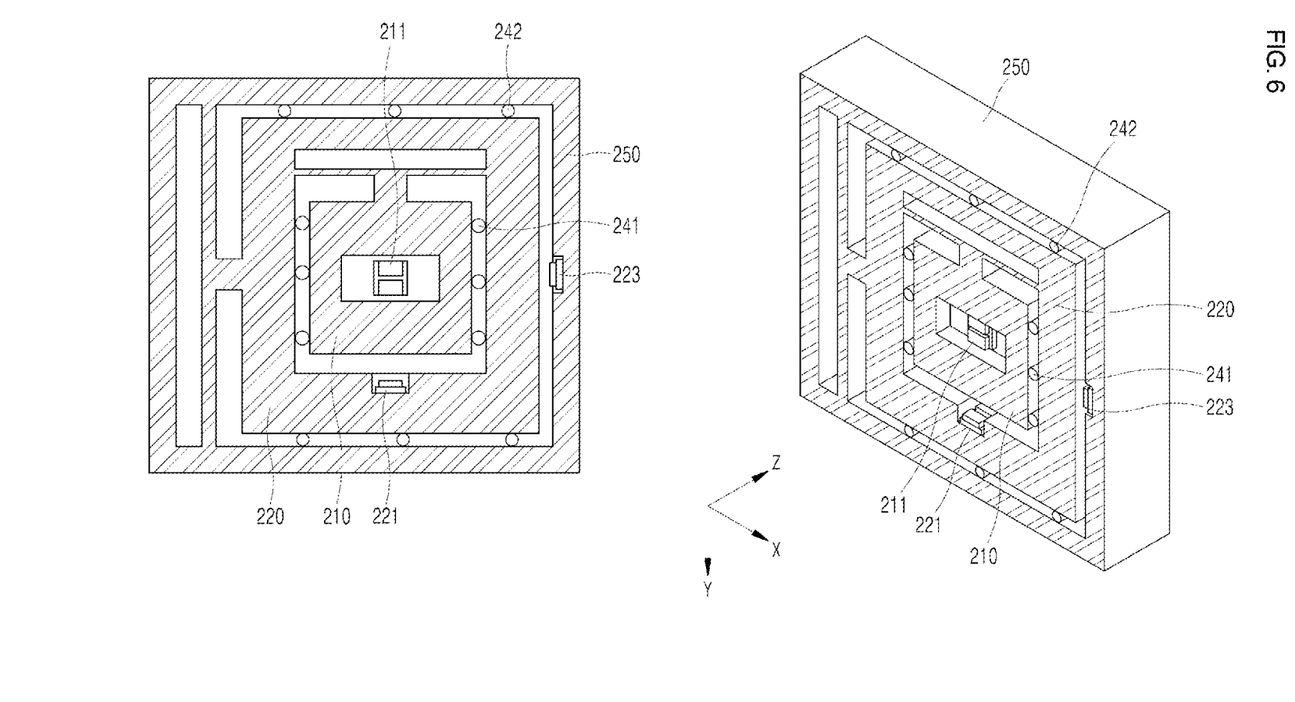
FIG. 6 is a cross-sectional view and a perspective view illustrating an example of a three-axis force sensor according to the embodiment of the present invention.

An example of a three-axis force sensor according to the embodiment of the present will be described with reference to FIG. 6.

The three-axis force sensor may include a vertical measurement module, a horizontal measurement module, decoupling units, a side frame, a bottom frame, and a cover frame.

The cover frame (not shown) serves as a cover of the three-axis force sensor and simultaneously serves as a point of application (a point of application of force). The cover frame may be preferably coupled to the upper portion of a body 210 of the vertical measurement module, and a force applied therethrough may be transferred to the body 210 of the vertical measurement module.

In addition, the cover frame may be preferably made of an elastic material, and thus may be physically deformed.

Meanwhile, the force applied to the cover frame is decoupled into a vertical component of force and a horizontal component of force by the decoupling units, which are designated by reference numeral 241 and 242, and the horizontal component of force may be additionally decoupled into a "first horizontal component of force" and a "second horizontal component of force" (which is perpendicular to the first horizontal component of force). For example, the force applied to the cover frame in FIG. 6 may be decoupled into a vertical component of force (Z-axis component of force), a "first horizontal component of force (Y-axis component of force)", and a "second horizontal component of force (X-axis component of force)".

The vertical measurement module is a component to measure the decoupled vertical component of force.

The vertical measurement module may include a body 210 opened in a direction in which it is coupled to the cover frame, and a displacement measurement sensor 211 formed on one surface within the body 210. Accordingly, the vertical measurement module may measure the deformation of the cover frame using the displacement measurement sensor 211, and thus may calculate the vertical component of force (e.g., the Z-axis component of force).

In addition, the displacement measurement sensor 211 may be an optical sensor in which light-emitting and light-receiving parts are formed on the same plane, as illustrated in FIG. 3, and may be installed in a groove formed on one surface within the body 210.

Meanwhile, the body 210 of the vertical measurement module has a structure that may move in a first horizontal direction (e.g., in a Y-axis direction), depending on the decoupling units 241 and 242. In addition, the body 210 of the vertical measurement module may have a structure that may transfer the "second horizontal component of force" (e.g., an X-axis component of force), from among the forces transferred from the cover frame, to an auxiliary horizontal measurement frame 220 which will be described later. In addition, one side of the body 210 of the vertical measurement module may be coupled to the auxiliary horizontal measurement frame 220 by an elastic body. Accordingly, when the force is applied to the cover frame, the body 210 of the vertical measurement module may be displaced in the first horizontal direction while deforming the elastic body (the elastic body coupling the body 210 to the auxiliary horizontal measurement frame 220), and may transfer the "second horizontal component of force" to the auxiliary horizontal measurement frame 220.

The horizontal measurement module is a component to measure the decoupled "first horizontal component of force" and "second horizontal component of force". The horizontal measurement module may measure the components of force, based on the movement of the body 210 of the vertical measurement module.

To this end, the horizontal measurement module may include the auxiliary horizontal measurement frame 220 formed between the body 210 of the vertical measurement module and the side frame 250. The auxiliary horizontal measurement frame 220 may be preferably coupled to each of the body 210 of the vertical measurement module and the side frame 250 by an elastic body or the like. In addition, the auxiliary horizontal measurement frame 220 has a structure that may move in the second horizontal direction (e.g., in the X-axis direction) by the decoupling units 241 and 242. In addition, when the force is applied to the cover frame, the "second horizontal component of force" is transferred to the auxiliary horizontal measurement frame 220 from the body 210 of the vertical measurement module, and the auxiliary horizontal measurement frame 220 may move in the second horizontal direction, based on the transferred component of force.

In addition, the horizontal measurement module may include a "first horizontal measurement module" to measure the "first horizontal component of force", and a "second horizontal measurement module" to measure the "second horizontal component of force". Here, 1) the "first horizontal measurement module" may measure the "first horizontal component of force", based on the movement of the body 210 of the vertical measurement module in the first horizontal direction. To this end, the "first horizontal measurement module" may include a displacement measurement sensor 221 which is installed on the auxiliary horizontal measurement frame 220 while facing the body 210 of the vertical measurement module. Accordingly, the "first horizontal measurement module" may measure the displacement of the body 210 of the vertical measurement module using the displacement measurement sensor 221, and thus may calculate the "first horizontal component of force". Meanwhile, the displacement measurement sensor 221 may be an optical sensor as described above, and preferably may be an optical sensor in which light-emitting and light-receiving parts are formed on the same plane, as illustrated in FIG. 3. In addition, the optical sensor may be installed in a groove formed on one surface within the auxiliary horizontal measurement frame 220. Thus, it is possible to prevent the damage of the optical sensor even though the optical sensor is installed very close to the body 210 of the vertical measurement module in order to be linearly operated. In addition, 2) the "second horizontal measurement module" may measure the "second horizontal component of force", based on the movement of the auxiliary horizontal measurement frame 220 in the second horizontal direction. To this end, the "second horizontal measurement module" may include a displacement measurement sensor 223 which is installed on the side frame 250 while facing the auxiliary horizontal measurement frame 220. Accordingly, the "second horizontal measurement module" may measure the displacement of the auxiliary horizontal measurement frame 220 using the displacement measurement sensor 223, and thus may calculate the "second horizontal component of force". Meanwhile, the displacement measurement sensor 223 may be an optical sensor, and preferably may be an optical sensor in which light-emitting and light-receiving parts are formed on the same plane. In addition, the optical sensor may be installed in a groove formed on one surface within the side frame 250. Thus, it is possible to prevent the damage of the optical sensor even though the optical sensor is installed very close to the auxiliary horizontal measurement frame 220 in order to be linearly operated.

The decoupling units 241 and 242 are components to decouple the force, applied to the point of application, into a vertical component of force, a "first horizontal component of force", and a "second horizontal component of force". The decoupling units 241 and 242 may decouple the deformation of the cover frame in the vertical direction (e.g., in the Z-axis direction), the movement of the body 210 of the vertical measurement module in the first horizontal direction (e.g., in the Y-axis direction), and the movement of the auxiliary horizontal measurement frame 220 in the second horizontal direction (e.g., in the X-axis direction).

To this end, the decoupling units 241 and 242 may preferably include first decoupling units 241 formed between the body 210 of the vertical measurement module and the auxiliary horizontal measurement frame 220, and second decoupling units 242 formed between the auxiliary horizontal measurement frame 220 and the side frame 250. In addition, the decoupling units 241 and 242 may further include bottom decoupling units (not shown) formed between the body 210 of the vertical measurement module and the bottom frame, and between the auxiliary horizontal measurement frame 220 and the bottom frame.

Meanwhile, each of the first decoupling units 241, the second decoupling units 242, and the bottom decoupling units may preferably have a ball shape or a roll shape.

The side frame 250 and the bottom frame (not shown) are components which serve as a housing of the three-axis force sensor. The side frame 250 and the bottom frame may serve as a body of the three-axis force sensor.

As described above, when a force is applied to the cover frame serving as a point of application, the three-axis force sensor may decouple the applied force into a "vertical component of force", a "first horizontal component of force", and a "second horizontal component of force" using the decoupling units 241 and 242. Here, the decoupled "vertical component of force" acts as a force for deforming the cover frame in a vertical direction, and is measured by the displacement measurement sensor 211 of the vertical measurement module. In addition, the decoupled "first horizontal component of force" acts as a force for moving the body 210 of the vertical measurement module in a first horizontal direction, and is measured by the displacement measurement sensor 221 of the first horizontal measurement module. In addition, the decoupled "second horizontal component of force" acts as a force for moving the auxiliary horizontal measurement frame 220 in a second horizontal direction, and is measured by the displacement measurement sensor 223 of the second horizontal measurement module.

Since the three-axis force sensor of the present invention decouples the applied force into the "vertical component of force", the "first horizontal component of force", and the "second horizontal component of force", and then independently measures them, there is no interference between the "vertical measurement", the "first horizontal measurement", and the "second horizontal measurement".

Figure 7:
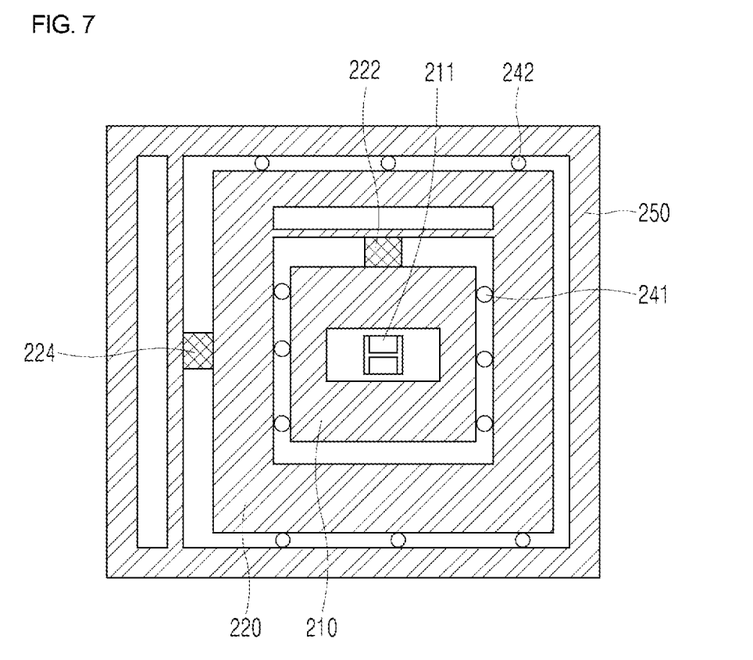
FIG. 7 is a cross-sectional view illustrating another example of a three-axis force sensor according to the embodiment of the present invention.

Another example of a three-axis force sensor according to the embodiment of the present invention will be described with reference to FIG. 7.

The three-axis force sensor in the present example may measure a "vertical component of force", a "first horizontal component of force", and a "second horizontal component of force" in a deformation measurement manner instead of the displacement measurement manner described above.

To this end, a "vertical measurement module" may include a deformation measurement sensor (not shown) instead of the displacement measurement sensor 211, a "first horizontal measurement module" may include a deformation measurement sensor 222 instead of the displacement measurement sensor 221, and a "second horizontal measurement module" may include a deformation measurement sensor 224 instead of the displacement measurement sensor 223.

In addition, the deformation measurement sensor included in the "vertical measurement module" may be mounted or coupled to a cover frame. The deformation measurement sensor 222 included in the "first horizontal measurement module" may be formed on a coupling portion in which a body 210 of the vertical measurement module is coupled to an auxiliary horizontal measurement frame 220. The deformation measurement sensor 224 included in the "second horizontal measurement module" may be formed on a coupling portion in which the auxiliary horizontal measurement frame 220 is coupled to a side frame 250.

Meanwhile, each of the deformation measurement sensors may be a resistive sensor, a strain gauge sensor, a pressure sensor, a capacitive sensor, or the like.

When a force is applied to the cover frame serving as a point of application, the three-axis force sensor in the present example may decouple the applied force into a "vertical component of force", a "first horizontal component of force", and a "second horizontal component of force" using decoupling units 241 and 242. Here, the decoupled "vertical component of force" acts as a force for deforming the cover frame in a vertical direction, and is measured by the deformation measurement sensor of the vertical measurement module. In addition, the decoupled "first horizontal component of force" acts as a force for moving the body 210 of the vertical measurement module in a first horizontal direction, and is measured by the deformation measurement sensor 222 of the first horizontal measurement module. In addition, the decoupled "second horizontal component of force" acts as a force for moving the auxiliary horizontal measurement frame 220 in a second horizontal direction, and is measured by the deformation measurement sensor 224 of the second horizontal measurement module.

Figure 8:
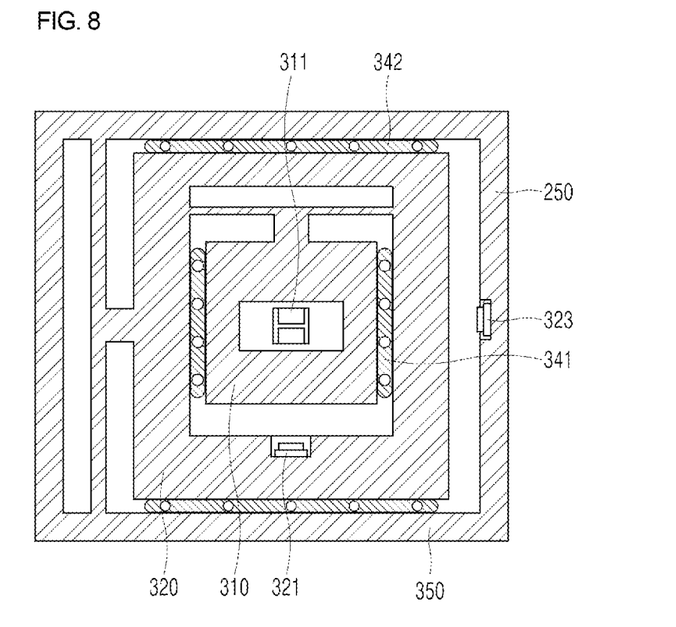
FIG. 8 is a cross-sectional view illustrating a further example of a three axis force sensor according to the embodiment of the present invention.
Figure 9:
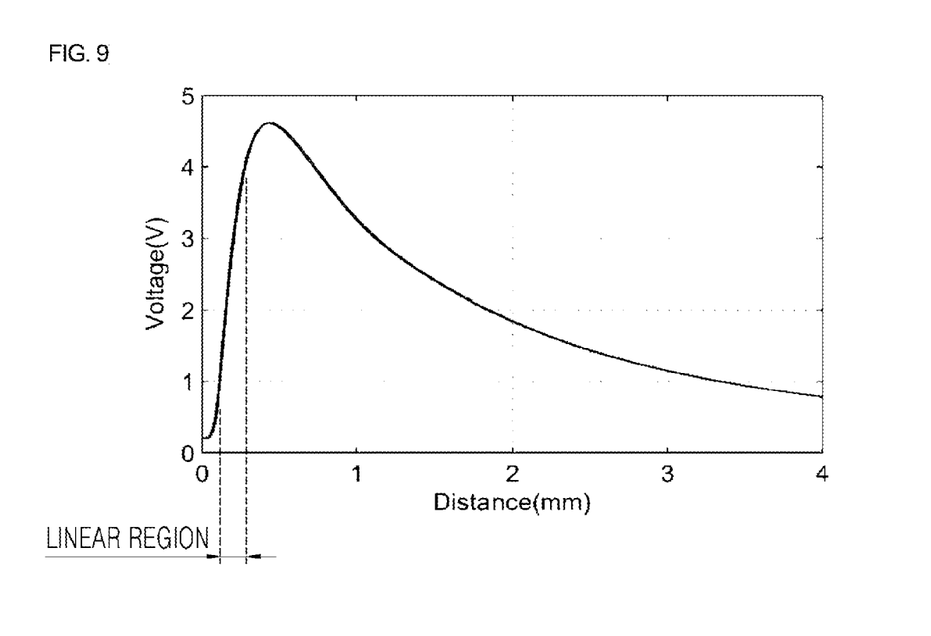
FIG. 9 is a graph illustrating the operation of the optical sensor according to the embodiment of the present invention.

A further example of a three-axis force sensor according to the embodiment of the present invention will be described with reference to FIG. 8.

The three-axis force sensor in the present example may include decoupling units 341 and 342, each of which has a roller guide shape or a linear guide shape.

For example, the decoupling units 341 and 342 may include 1) a first decoupling unit 341 which is formed between a body 310 of a vertical measurement module and an auxiliary horizontal measurement frame 320 and has a roller guide shape or a linear guide shape, and a second decoupling unit 342 which is formed between the auxiliary horizontal measurement frame 320 and a side frame 350 and has a roller guide shape or a linear guide shape.

Similar to the above examples of the embodiment, the decoupling units 341 and 342 may decouple the force, applied to a point of application, into a "vertical component of force", a "first horizontal component of force", and a "second horizontal component of force". In addition, the decoupling units 341 and 342 may decouple the deformation of a cover frame in a vertical direction (e.g., in a Z-axis direction), the movement of the body 310 of the vertical measurement module in a first horizontal direction (e.g., in a Y-axis direction), and the movement of the auxiliary horizontal measurement frame 320 in a second horizontal direction (e.g., in an X-axis direction).

Meanwhile, each of the first and second decoupling units 341 and 342 has a guide shape, thereby enabling the horizontal movement of the "body 310 of the vertical measurement module" and the horizontal movement of the auxiliary horizontal measurement frame 320 to be smoothly performed. Accordingly, the present example differs from the above other examples in that the bottom decoupling units formed between the body 310 of the vertical measurement module and the bottom frame, and between the auxiliary horizontal measurement frame 320 and the bottom frame may be removed.

Hereinafter, the optical sensor used in the embodiment of the present invention will be described in more detail.

For reference, the above-mentioned optical sensor may measure a displacement to generate an output voltage of TTL level (0 to 5V). In addition, the optical sensor may be linearly operated only in a range of very small displacement, as will be seen in FIG. 9.

In addition, the optical sensor may include a light-emitting part and a light-receiving part, and may measure a displacement using the same. For example, the optical sensor emits light using the light-emitting part and receives light reflected from the surface of an object to be measured through the light-receiving part, so as to measure the displacement of the object to be measured. Here, the light-emitting part may be embodied in various forms such as a light-emitting diode, and the light-receiving part may be embodied in various forms such as a photo transistor. In addition, although each of the light-emitting and light-receiving parts may be formed by a separate device, it is preferably formed in the form of a single device on the same place.

$$\delta = \frac{FL^3}{24EI} \quad \text{[Equation 1]}$$

Meanwhile, information of a displacement ($\delta$) measured by the displacement sensor such as the optical sensor may be converted into force information using various algorithms. For example, when an object to be measured is moved depending on an elastic body in the form of a leaf spring, the displacement information may be converted into force information by the above Equation 1.

Hereinafter, a force measurement apparatus according to the embodiment of the present invention will be described.

The force measurement apparatus according to the embodiment of the present invention may include a "multi-axis force sensor" to measure forces in a plurality of directions, and a processor to process signals generated by the multi-axis force sensor.

The multi-axis force sensor is a component to measure components of force in a plurality of directions. The multi-axis force sensor may independently measure the components of force in the plurality of directions, particularly based on an interference suppression structure.

The multi-axis force sensor corresponds to the multi-axis force sensor of the present invention described above. Accordingly, although not described in more detail in order to avoid repetition, the above-mentioned features may be applied to the multi-axis force sensor as it is.

The processor is a component to process signals generated by the multi-axis force sensor. Specifically, the processor is a component to calculate force information on the plurality of directions based on the signals generated by the multi-axis force sensor.

The processor may perform independent calibration operations on the plurality of directions (e.g., X-axis, Y-axis, and Z-axis directions), and thus may calculate force information on each direction (for reference, the calibration processes are independently feasible because the multi-axis force sensor independently generates signals indicative of the plurality of directions, based on the interference suppression structure).

Accordingly, the calibration matrix (C) expressing the calibration operations of the processor may be embodied in the form of diagonal matrix as in the following Equation 2.

$$F_i = C_i V_i \quad \text{[Equation 2]}$$

$$\begin{bmatrix} F_x \\ F_y \\ F_z \end{bmatrix} = \begin{bmatrix} C_1 & 0 & 0 \\ 0 & C_2 & 0 \\ 0 & 0 & C_3 \end{bmatrix} \begin{bmatrix} V_1 \\ V_2 \\ V_3 \end{bmatrix}$$

In addition, the processor may be embodied in various forms such as a universal central processing unit (CPU), programmable device elements (CPLD, FPGA) suitable for specific purpose, an on-demand application specific integrated circuit (ASIC), and a micro-controller chip.

Meanwhile, the force measurement apparatus may further include a communication module, and may transmit and receive data through a communication network.

In addition, the force measurement apparatus may be a robot apparatus, a wearable apparatus, an IOT (Internet of things) apparatus, or the like. In addition to these apparatuses, the force measurement apparatus may be embodied in various forms such as electronic apparatuses required for force measurement.

As is apparent from the above description, the present invention can provide an interference suppression structure that suppresses axial interference. Specifically, the present invention can provide an interference suppression structure that suppresses axial interference, based on "decoupling units (e.g., a ball, a roller, a linear guide, and a roller guide)" and "the horizontal movement of a vertical measurement module". Thus, the present invention can reduce an error in axial measurement in the process of sensing multi-axis force.

In addition, the present invention can simplify a calibration process in the process of sensing multi-axis force. Specifically, since the present invention suppresses axial interference through the interference suppression structure, it is possible to exclude the calibration for compensating interference. In addition, since the present invention independently calibrates signals generated by axial sensors to generate information on each axial force, it is possible to simplify the calibration process in the process of sensing multi-axis force.

In addition, the present invention can embody a multi-axis force sensor by means of using conventional single-axis sensors. Specifically, since the present invention suppresses axial interference through the interference suppression structure and independently measures each axial force as the unit of single-axis, the multi-axis force sensors can be embodied even when the conventional single-axis sensors are used.

In addition, the present invention can embody the multi-axis force sensor which is manufactured in a compact form even when it is operatively connected to wireless communication devices. Specifically, the present invention can suppress axial interference through the interference suppression structure, and can embody axial sensors as an optical sensor. Consequently, it is possible to embody the multi-axis force sensor without having an amplifier (which is an obstacle to miniaturization) even when it is operatively connected to wireless communication devices.

In addition, the present invention can provide an optical sensor structure that allows the multi-axis force sensor to be miniaturized. Specifically, the light-emitting and light-receiving parts of the optical sensor are formed on the same plane, and thus the optical sensor can be installed on the single surface of the multi-axis force sensor. Consequently, the present invention can provide the optical sensor structure that allows the multi-axis force sensor to be more miniaturized.

In addition, the present invention can provide a structure that prevents the damage of the optical sensor when the optical sensor is linearly operated. Specifically, since the present invention forms the light-emitting and light-receiving parts of the optical sensor on the same plane, and installs the optical sensor in a groove formed on the surface of the frame, it is possible to prevent the damage of the optical sensor even though the optical sensor is installed very close to an object to be measured in order to be linearly operated.

The present invention is not limited to the foregoing effects, and other effects thereof will be dearly understood by those skilled in the art from the following claims.

Although the present invention has been described with respect to the illustrative embodiments, it will be apparent to those skilled in the art that various variations and modifications may be made without departing from the spirit and scope of the invention as defined in the following claims.

What is claimed is:

1. A multi-axis force sensor comprising:
   a vertical measurement module to measure a vertical component of force applied to a point of application;
   a horizontal measurement module to measure a horizontal component of force applied to the point of application;
   decoupling units for decoupling the vertical and horizontal components of force applied to the point of application; and
   an auxiliary horizontal measurement frame formed between the vertical measurement module and a side frame while being coupled to each of the vertical measurement module and the side frame,
   wherein each of the decoupling units has a ball shape, a roller shape, a roller guide shape, or a linear guide,
   wherein the vertical measurement module has a body horizontally moved by the horizontal component of force applied to the point of application,
   wherein the horizontal measurement module measures the horizontal component of force applied to the point of application, based on the movement of the body of the vertical measurement module, and
   wherein the body of the vertical measurement module is moved in a first horizontal direction by the horizontal component of force applied to the point of application, the auxiliary horizontal measurement frame is moved in a second horizontal direction by the horizontal component of force applied to the point of application, and the first horizontal direction is perpendicular to the second horizontal direction.

2. The multi-axis force sensor according to claim 1, wherein the vertical measurement module comprises a deformation measurement sensor to measure a deformation by the vertical component of force, or a displacement measurement sensor to measure a variation in displacement by the vertical component of force.

3. The multi-axis force sensor according to claim 2, wherein:
   the displacement measurement sensor comprises an optical sensor having a light-emitting part and a light-receiving part; and
   the light-emitting and light-receiving parts of the optical sensor are formed on the same plane.

4. The multi-axis force sensor according to claim 1, wherein, in order to decouple the horizontal component of force applied to the point of application into a first horizontal component of force and a second horizontal component of force, the decoupling units comprises:
   a first decoupling unit formed between the auxiliary horizontal measurement frame and the vertical measurement module; and
   a second decoupling unit formed between the side frame and the auxiliary horizontal measurement frame.

5. The multi-axis force sensor according to claim 4, wherein:
   each of the first and second decoupling units has a ball shape or a roller shape; and
   the decoupling units further includes a ball shape or a roller shape formed between the vertical measurement module and a bottom frame and between the auxiliary horizontal measurement frame and the bottom frame.

6. The multi-axis force sensor according to claim 4, wherein each of the first and second decoupling units has a roller guide shape or a linear guide shape.

7. The multi-axis force sensor according to claim 1, wherein the horizontal measurement module comprises:
   a first horizontal measurement module to measure the first horizontal component of force;
   a second horizontal measurement module to measure the second horizontal component of force, and
   wherein each of the first and second horizontal measurement modules comprises a deformation measurement sensor or a displacement measurement sensor.

8. The multi-axis force sensor according to claim 7, wherein the displacement measurement sensor is installed in a groove formed on a surface of the auxiliary horizontal measurement frame or on a surface of the side frame.

9. The multi-axis force sensor according to claim 8, wherein:
   the first horizontal measurement module comprises the displacement measurement sensor;
   the displacement measurement sensor of the first horizontal measurement module comprises an optical sensor having a light-emitting part and a light-receiving part formed on the same plane; and
   the optical sensor is installed in a groove formed on the surface of the auxiliary horizontal measurement frame.

10. The multi-axis force sensor according to claim 8, wherein:
    the second horizontal measurement module comprises the displacement measurement sensor;
    the displacement measurement sensor of the second horizontal measurement module comprises an optical sensor having a light-emitting part and a light-receiving part formed on the same plane; and the optical sensor is installed in the groove formed on the surface of the side frame.

* * * * *